Figure 1:
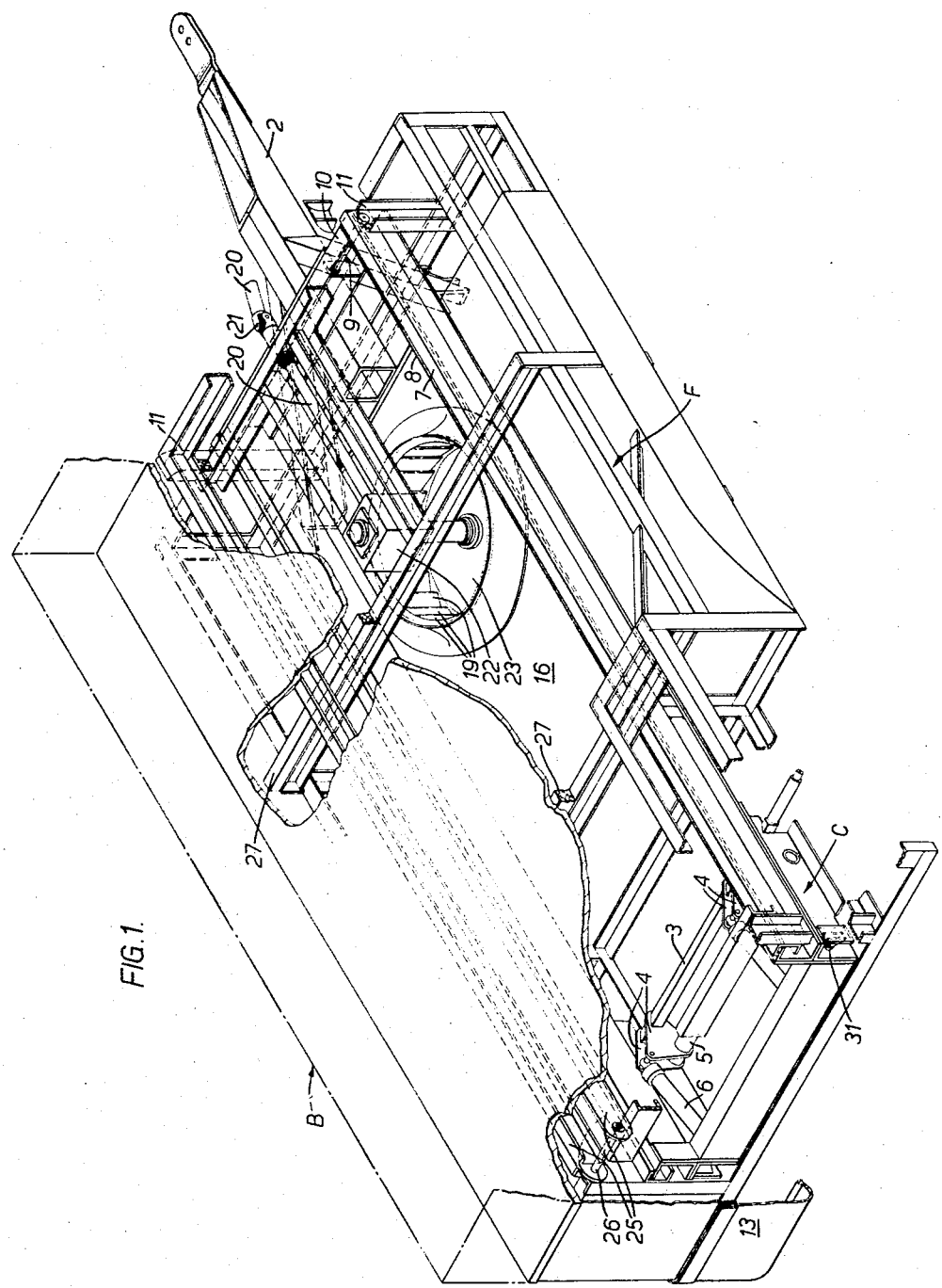

Aug. 8, 1967 E. C. KENNEDY ET AL 3,334,700

LAND VEHICLES

Filed June 28, 1965 5 Sheets-Sheet 1

INVENTORS
EDMUND CLIVE KENNEDY
JOHN WILLIAM PATTISON
By: Norris + Bateman, Attys

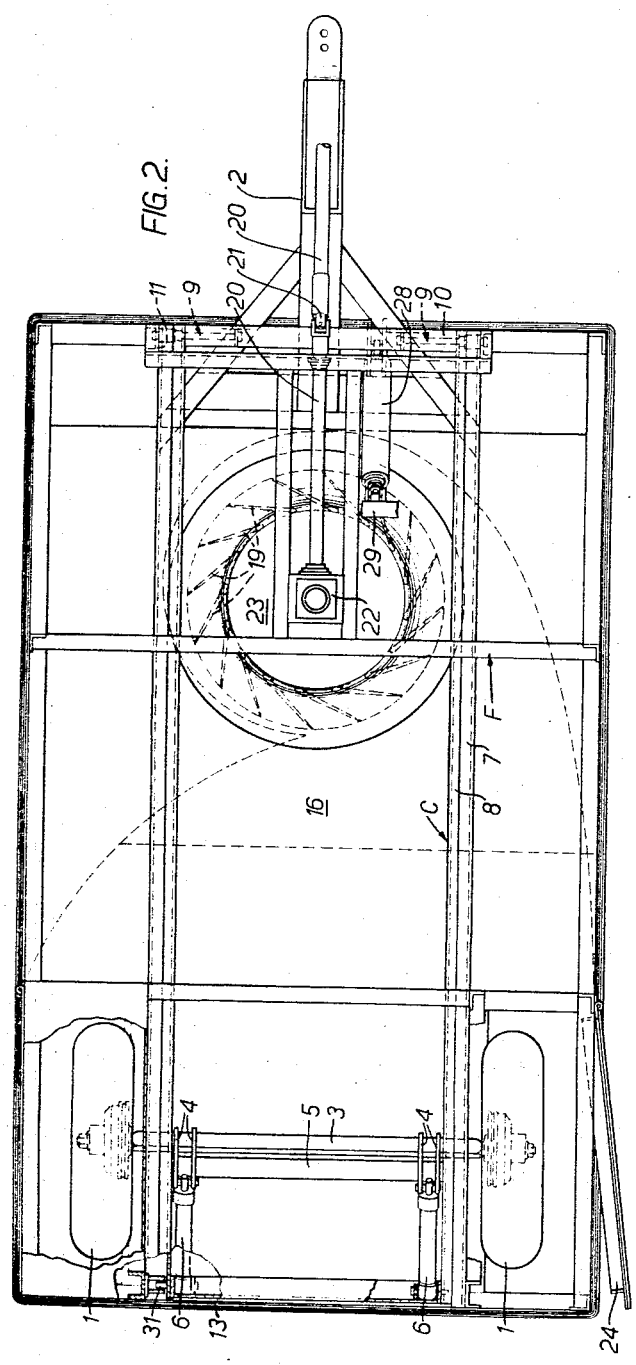

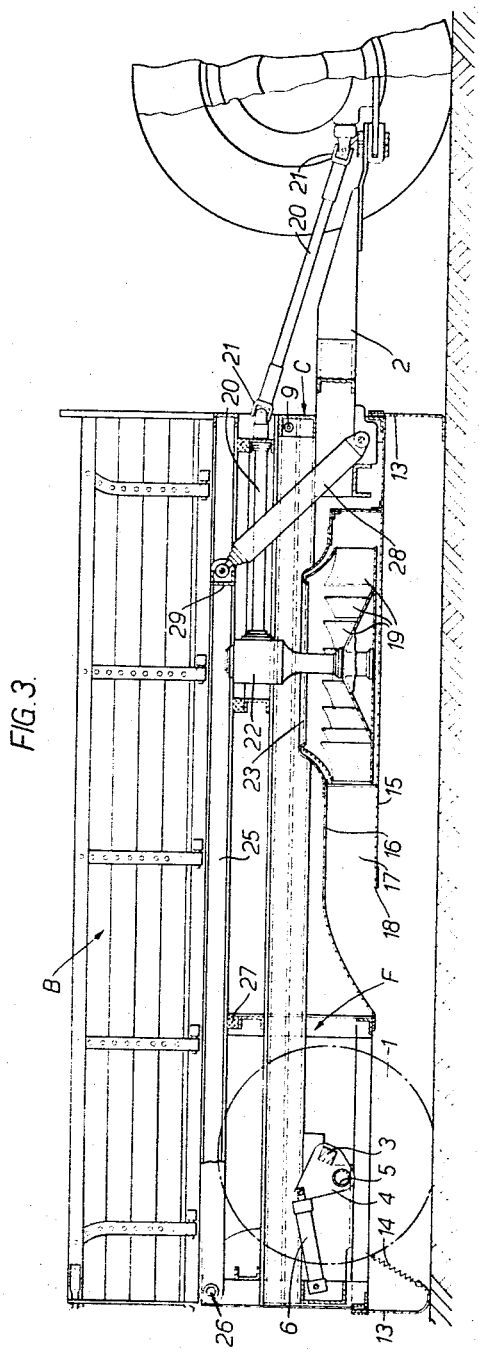

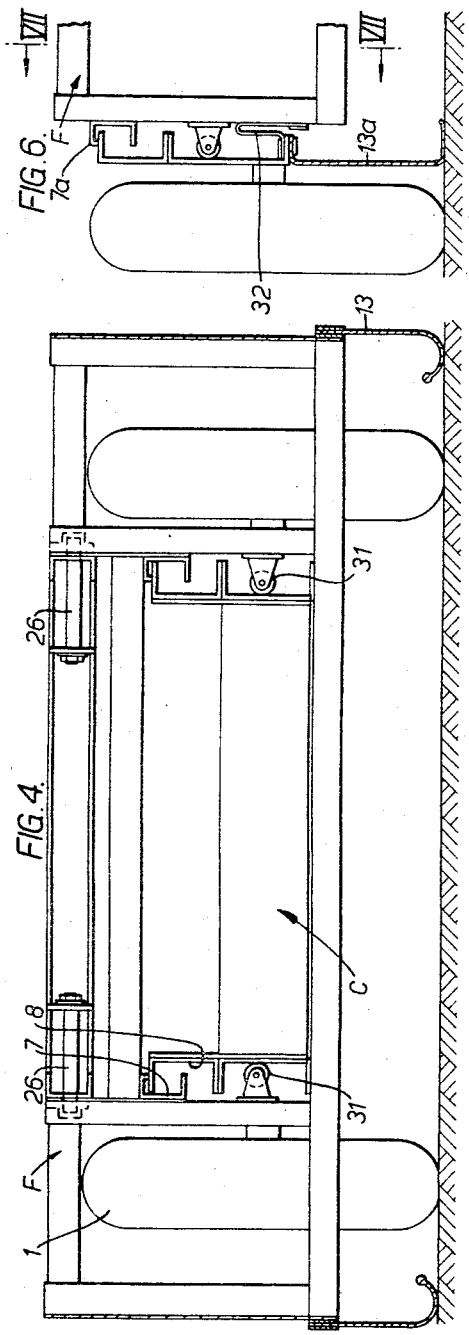

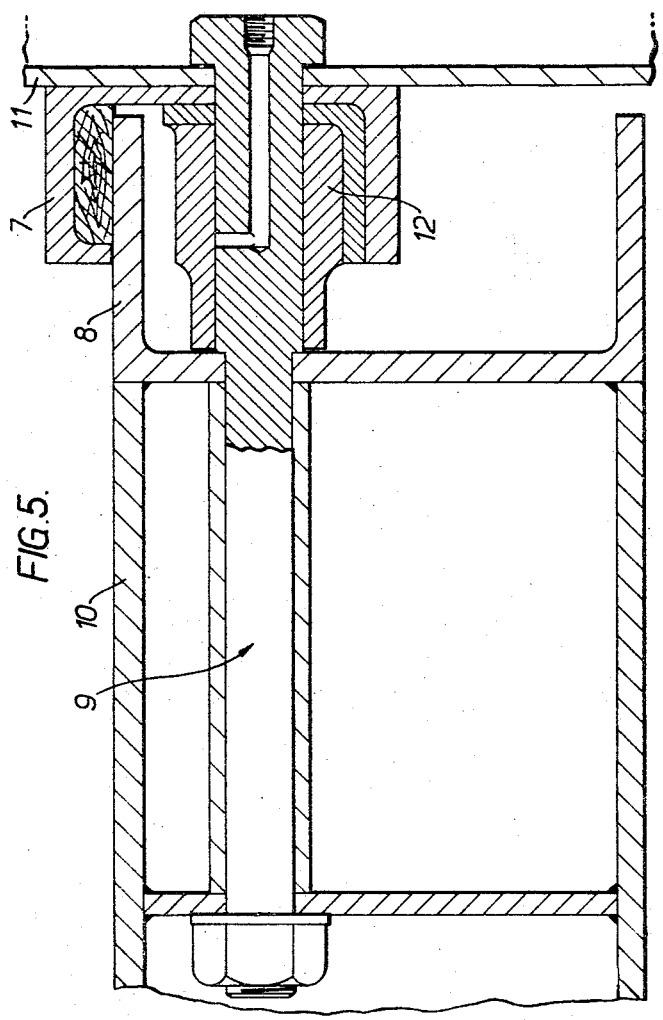
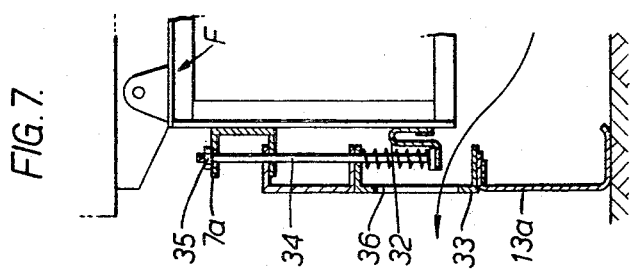

3,334,700
LAND VEHICLES
Edmund C. Kennedy, 4 Fowberry Crescent, Fenham, Newcastle-upon-Tyne, England, and John W. Pattison, 13 Nelson Ave., South Shields, Durham County, England
Filed June 28, 1965, Ser. No. 467,512
9 Claims. (Cl. 180—7)

This invention relates to land vehicles having ground-engaging wheels or runners and provides improved means for reducing the weight upon the wheels or runners, as and when required, so that the vehicle can traverse more easily wet and soft ground where under normal conditions it would soon become bogged down, whilst ensuring sufficient adhesion of the wheels or runners with the ground at all times.

According to the invention a land vehicle comprises power-driven means for creating beneath the vehicle and within a boundary curtain a cushion or air adapted to provide supplementary support for the vehicle, and means operable automatically to limit the degree of such supplementary support to prevent the wheels or runners being lifted from the ground.

One particular application of the invention is to trailers for agricultural and similar purposes and a preferred embodiment of the invention devised for this purpose will now be described with reference to the accompanying drawings wherein FIG. 1 is a perspective view of the vehicle with parts thereof broken away to reveal details of construction, FIG. 2 is a plan view of the vehicle with the body removed, FIG. 3 is a longitudinal part-sectional elevation of the complete vehicle, FIG. 4 is a rear end view thereof, FIG. 5 is a fragmentary view showing in section details of a front end hinge assembly, FIG. 6 is a fragmentary view showing a modification in which the road wheels of the vehicles are located outside the curtained cushion of air, and FIG. 7 is a cross section on the line VII—VII of FIG. 6.

Referring first to FIGS. 1–5, the trailer vehicle shown comprises basically a rectangular chassis C supported towards its rear end upon a pair of ground wheels 1 and provided at its forward end with the usual towing bar or hitch 2, a frame F mounted upon the chassis and capable of limited movement relative thereto about hinge means at the front end thereof, said frame supporting the air cushion generating and retaining means, and a body B resting upon the frame and having hinge connection thereto at its rear end for load tipping purposes. The chassis C is of welded girder construction, the wheels being mounted on an axle 3 carried by pairs of plates 4 which are rotatable about a fixed transverse tube 5 under the action of hydraulic rams 6 or equivalent means to raise or lower the wheels relative to the casssis proper for the purpose hereafter described.

The frame F is also fabricated by welding girder and similar members and comprises a rectangular box-like structure of such dimensions as to enclose the chassis including the ground wheels, said frame being pivotally mounted at its forward end on the chassis and including longitudinal channel members 7 which embrace the upper flanges of complementary channel members 8 of the chassis, see FIG. 4, and the arrangement being such that the frame normally rests by means of members 7 on the chassis and which members limit upward hinging movement of the frame relative to the chassis. The hinge connections between chassis and frame each comprise a hinge pin or bolt 9 rigidly supported in a transverse end member 10 of the chassis and extending outwardly through the channel member 7 and associated frame member 11 fixed to it, said hinge pin being received with close rotating fit in a lubricated bush 12 welded to channel member 7. Any equivalent hinge structure may of course be used. Depending from the lower peripheral edge of the frame is an all-round skirt or curtain 13 of sheet rubber, rubberised fabric or similar flexible material, said curtain being of such depth that normally the lower edge portion is inturned to make close sealing contact with the ground. The free edge of the curtain at the rear end of the frame, and if desired along the side edges of the frame, is held against permanent displacement by elastic means, shown for example as a spring 14 in FIG. 3.

The frame is closed at its underside by a metal floor 15 and spaced above the floor is a sheet metal pressing 16 defining with the floor a volute chamber 17 which opens downwards through an aperture 18 in the floor to the space beneath the frame enclosed by the curtain. Located within the chamber and rotatable about a vertical axis is a fan 19 adapted to be driven from the power take-off of a tractor or like towing vehicle through a divided drive shaft 20, universal joints 21 and a gearbox 22, the fan in operation drawing air into the chamber through an opening 23 in thet pressing 16 discharging it through the aperture 18. In this manner an air cushion is created beneath the frame which, acting on the underside of the vehicle, takes part of the weight of the vehicle off the ground wheels so enabling the trailer to transverse ground into which it would otherwise sink.

It is necessary that the degree of lift imparted by the air cushion be so controlled that adhesion between the wheels and the ground is not lost as this would not only result in loss of directional stability but could be dangerous where the trailer is standing on or travelling over sloping ground. In the construction above described, the required control is provided by the curtain 13, the depth of which is so chosen that, after a predetermined degree of relative movement of the frame and chassis, the curtain leaves the ground and the air cushion pressure is reduced. The curtain may be adjustable in depth or be adjustably mounted on the frame in order to regulate the pressure build up beneath the vehicle and thereby the proportion of the weight to be supported by the air cushion, the curtain retaining means 14 ensuring that the curtain returns to the proper operative condition after a venting of the air cushion.

The ram means 6 can also be used to vary the relative disposition of the axle 3 and thereby the effective height of the vehicle above the ground this device also has another useful purpose, namely that in conjunction with the air cushion forming means it makes possible replacement or servicing of a road wheel without the use of a jack. It will be noted from FIG. 2 that the frame structure includes at each side a hinged door 24 providing access to a road wheel and, assuming that such wheel is to be changed, the fan is used to build up the air cushion beneath the vehicle and to raise the frame to its maximum height, a suitable prop or support is then placed beneath the end of the frame and the rams 6 are then actuated to rock the plates 4 about the tube 5 and so lift the ground wheels clear of the ground.

The body B, which may be of any suitable type or may be substituted by a simple load-carrying platform, is carried by a series of longitudinal bars or girders 25 which are pivotally attached at their rear ends to the frame F, for example by hinge structures 26 similar to the hinge connections 9, 12, the bars 25 normally resting upon a series of cross bearers 27 on the frame but being capable of being swung upwards about the hinges 26 for load tipping purposes by a hydraulic ram 28 extending between the chassis and a cross member 29 welded to the bars 25.

Any other form of power-operated or manually-operated raising gear may be used in place of the ram 28. The uprights 11 at the forward end of the frame act to guide the body towards the end of a lowering movement, the frame also carrying rollers 31 at its rearward end engageable with the sides of the chassis to guide the rear end of the frame during rising and falling movements.

FIGS. 6 and 7 illustrate a modification necessary when the ground wheels are mounted outside the frame. With this arrangement, the side curtain 13a is attached to the chassis and a sealing strip 32 attached at one edge to the movable frame F is normally held at the other edge in contact with a flange of the chassis member 33 and across the rear of the frame by a series of spring loaded rods one of which is shown at 34. When the air cushion raises the frame a predetermined height, a channel member 7a on the frame engages an abutment 35 on the rod and lifts the rod whereby the sealing strip 32 is rendered inoperative and the cushion of air contained within the curtain is vented to atmosphere through openings 36 in the chassis member 33.

It is to be understood that the above-described embodiments are given by way of example only and are capable of wide modification. Thus, the power-driven fan may be disposed externally of the trailer body, such as on an extension of the chassis or of the towing bar, the output of the fan being conducted to the required zone by ducting located internally or externally of the chassis. Moreover, although driving of the fan from the power take off of the towing vehicle is convenient and economical, the fan may be provided with its own driving motor where desired.

It is also to be noted that whilst the invention has been described in relation to a wheeled vehicle, it also has application to sledges and similar vehicles fitted with skids or runners to increase their utility particularly under severe arctic conditions.

We claim:

1. In a vehicle having a chassis supported on a running gear comprising ground engaging traction members such as wheels or runners, a load bearing frame mounted for limited relative vertical movement on said chassis, means for maintaining a pressurized air cushion beneath said vehicle providing supplementary support lifting said load bearing frame relative to the chassis as the vehicle moves along the ground, and means actuated by lift of said frame relative to the chassis for automatically controlling the air pressure in said cushion to limit the degree of said supplementary support for maintaining the traction members in contact with the ground.

2. In the vehicle defined in claim 1, said frame including a floor and a superimposed casing defining between them a volute chamber, said means for maintaining a pressurized air cushion defining a ground engaging boundary curtain for the space occupied by said air cushion including a power-driven fan located at the centre of said chamber and delivering air through an aperture in the floor to the space below bounded by the curtain.

3. In the vehicle defined in claim 1, said lift actuated control means being effective to vent said air cushion to atmosphere when pressure in said cushion exceeds a predetermined value to cause a corresponding predetermined lift of the frame.

4. In the vehicle defined in claim 1, said frame being pivotally mounted on the chassis to permit said relative vertical movement and there being cooperating means on said chassis and frame for limiting said relative vertical movement.

5. In the vehicle defined in claim 1, said chassis being a trailer attached to be drawn by a power driven vehicle unit and said traction members being wheels supporting the rear end of said chassis, said frame being movably mounted on the forward end of said chassis and extending toward the rear end of said chassis, and said means maintaining the air cushion comprising a blower system having an input drive connection from said unit arranged to provide said air cushion mainly beneath the rear end of said frame.

6. In the vehicle defined in claim 1, said air cushion maintaining means comprising a ground engaging skirt the interior of which is pressurized by air from a power driven fan mounted on said frame.

7. In the vehicle defined in claim 6, said skirt depending from said frame and having predetermined vertical dimensions whereby a predetermined degree of lift of said frame will separate the skirt from the ground to vent the air cushion.

8. In the vehicle defined in claim 6, said skirt being mounted on the chassis and said air cushion maintaining means further including a flexible seal between the frame and chassis, and said means for controlling air pressure in said cushion comprising a valve including in part said flexible seal and operative to vent the interior of said cushion to atmosphere upon predetermined lift of said frame relative to the chassis.

9. In the vehicle defined in claim 6, resilient means biasing the lower part of said skirt toward the ground.

References Cited

UNITED STATES PATENTS

| | | |
|---|---|---|
| 936,395 | 10/1909 | Worthington. |
| 1,698,482 | 1/1929 | Nicin _____ 180—7 |
| 2,606,674 | 8/1952 | Edwards _____ 298—17.6 X |

FOREIGN PATENTS

| | | |
|---|---|---|
| 1,338,368 | 8/1963 | France. |
| 938,664 | 10/1963 | Great Britain. |

A. HARRY LEVY, *Primary Examiner.*